Jan. 31, 1928.
E. CANTONO
1,657,525
SUSPENSION OF VEHICLES
Filed June 2, 1922
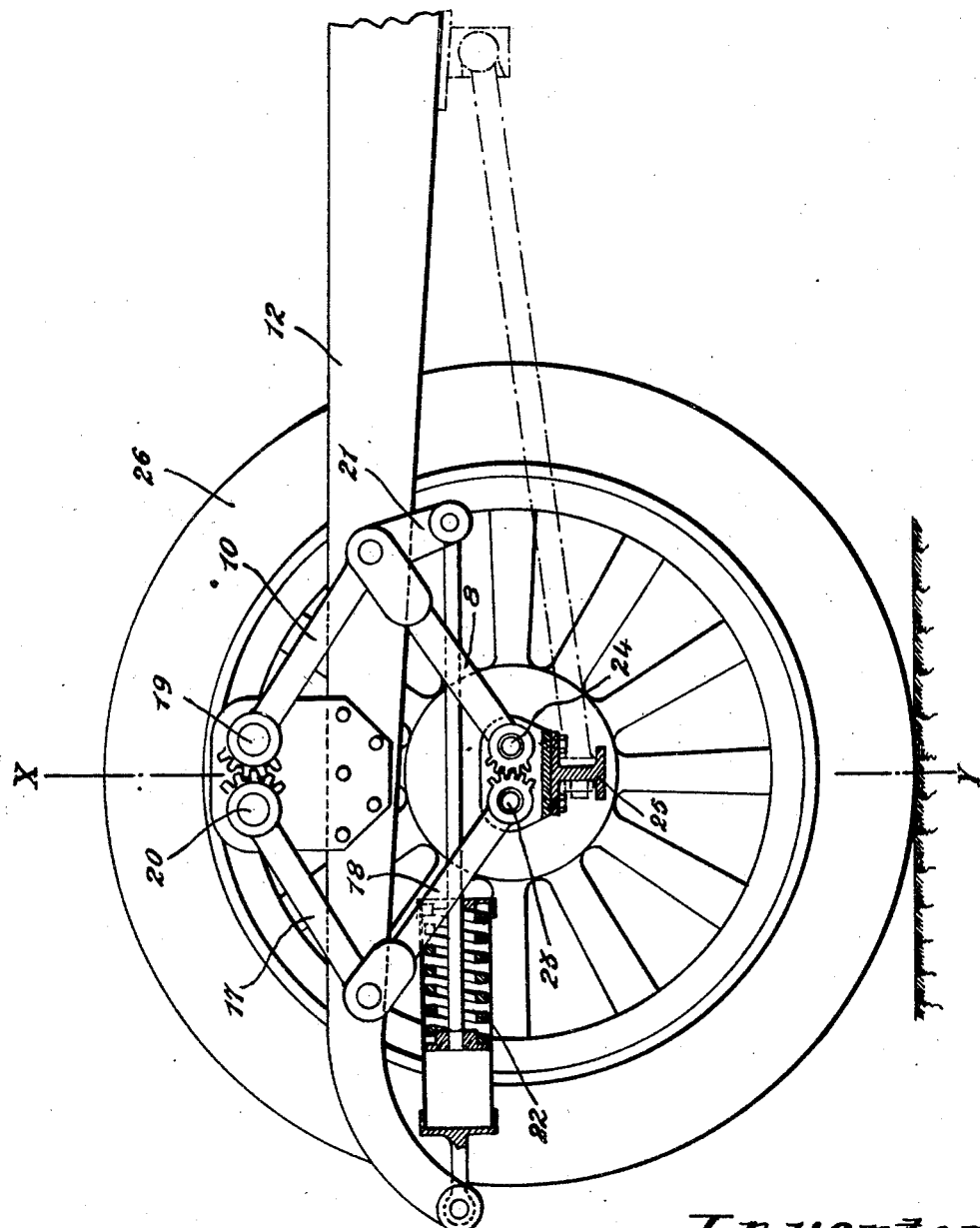
Inventor
E. Cantono,
By Marks&Clerk
Attys.

Patented Jan. 31, 1928.

1,657,525

UNITED STATES PATENT OFFICE.

EUGENIO CANTONO, OF ROME, ITALY.

SUSPENSION OF VEHICLES.

Application filed June 2, 1922, Serial No. 565,353, and in Italy September 22, 1921.

The invention relates to improvements in vehicle suspension and consists substantially in that a system of joint levers is inserted between the underframe and the axle of the vehicle so that the changing of the springs is transmitted to the under frame in such a manner that the vertical component of the resultant of the lever system is nearly constant within practical limits for every position of the wheels with respect to the vehicle.

It is clear that by means of a proper arrangement of springs, levers and other organs the variations of spring elasticity can be reduced to the least so that a smooth running of the vehicle may be secured.

It is also clear that the invention may be applied to new constructions as well as to old ones to correct a defective suspension.

In the accompanying drawing there is shown a part of a vehicle with the invention applied thereto.

Referring to the drawing in detail, the improvement consists in connecting the two pivotally connected lever arms (10) and (8) with two other lever arms (17) and (18) by means of a suitable mechanical expedient by which the movement of the arms 10 and 8 is transmitted to the arms 17 and 18, the latter moving in opposition to the arms 8 and 10.

The lever arms 10 and 17 may oscillate around the pivots (19) and (20) both fixed to the underframe. Each arm is provided with a toothed quadrant, both quadrants engaging one another, consequently if one of the lever arms for instance (10) describes a certain angle of rotation around its own pivot (19) the other arm must describe the same angle around its own pivot (20).

The lower end of the lever (17) is articulated to the upper end of the lever (18).

Lever (10) is connected with the upper end of a lever arm (21), the latter being connected with and subjected to the tension of a spring 22.

The lower ends of levers (18) and (8) oscillate around pivots 23 and 24 fixed to a support on the axle (25) and said levers are also geared together in the same manner as the lever arms 10 and 17.

By means of the suspension described the movements of the arms (10) and (17) correspond exactly to those of the arms (8) and (18) though taking place in opposite directions, so that the parallelogram of forces constituted by these four arms is allowed to lengthen or to be compressed but in the direction of the vertical XY. The wheel (26) under the action of spring (22) can freely descend into a depression of the ground but it can be shifted neither forwardly or rearwardly relative to the body of the vehicle.

Having now particularly described and ascertained the nature of my said invention and in what manner the same is to be performed I declare that what I claim is:

1. In combination, a vehicle body and an axle arranged thereunder, pairs of links, the links of each pair being pivotally connected with one another and with the vehicle body and said axle, the pivotal connection between the links of one pair and the body and axle being displaced with respect to the pivotal connections between the links of the other pair and said body and axle, and means connecting the links of the pairs, whereby to cause corresponding angular displacements of the links of both pairs.

2. In combination, a vehicle body and an axle arranged thereunder, pairs of links, the links of each pair being pivotally connected with one another and with the vehicle body and said axle, the pivotal connection between the links of one pair and the body and axle being displaced with respect to the pivotal connections between the links of the other pair and said body and axle, and means connecting the links of the pairs, whereby to cause corresponding angular displacements of the links of both pairs, and spring means associated with said links.

3. In combination, a vehicle, an axle, pairs of links, means pivotally connecting the links of each pair together and also with the body and axle, the pivotal connections between the links of one pair with the body and axle being displaced with respect to the pivotal connections between the links of the other pair and said body and axle, and intermeshing gear teeth carried by the adjacent extremities of the links of the respective pairs adapted to cause the latter to undergo corresponding angular displacement.

4. In combination, a vehicle, an axle, pairs of links, means pivotally connecting the links of each pair together and also with the body and axle, the pivotal connections between the links of one pair with the body and axle being displaced with respect to the pivotal connections between the links of the other pair and said body and axle, and intermeshing gear teeth carried by the adjacent extremities of the links of the respective pairs adapted to cause the latter to undergo corresponding angular displacement, and spring associated with said links.

In testimony whereof I have hereunto signed my name.

EUGENIO CANTONO.